US010380541B2

(12) United States Patent
Wood Bradley et al.

(10) Patent No.: US 10,380,541 B2
(45) Date of Patent: Aug. 13, 2019

(54) STOCK MANAGEMENT FOR ELECTRONIC TRANSACTIONS

(71) Applicant: International Business Machines Corporation, Armonk, NY (US)

(72) Inventors: Lisa Marie Wood Bradley, Cary, NC (US); Nan Li, Cedar Park, TX (US); Charles E. Wiese, Raleigh, NC (US); Marissa A. Wood, Laguna Vista, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 722 days.

(21) Appl. No.: 14/274,383

(22) Filed: May 9, 2014

(65) Prior Publication Data
US 2015/0186980 A1 Jul. 2, 2015

Related U.S. Application Data

(63) Continuation of application No. 14/144,117, filed on Dec. 30, 2013.

(51) Int. Cl.
*G06Q 10/08* (2012.01)
*G06Q 30/02* (2012.01)
*G06Q 30/06* (2012.01)
*G06Q 30/00* (2012.01)

(52) U.S. Cl.
CPC ....... *G06Q 10/087* (2013.01); *G06Q 30/0202* (2013.01); *G06Q 30/0635* (2013.01)

(58) Field of Classification Search
CPC .... G06Q 10/087; G06Q 20/203; G06Q 10/08; G06Q 10/0875; G06Q 10/06
USPC ........................................................ 705/28
See application file for complete search history.

(56) References Cited

U.S. PATENT DOCUMENTS

| 5,870,716 | A | 2/1999 | Sugiyama et al. | |
|---|---|---|---|---|
| 7,155,306 | B2 * | 12/2006 | Haitin ................... | A61G 12/001 700/242 |
| 8,285,573 | B1 * | 10/2012 | Ballaro et al. ................... | 705/22 |
| 8,321,302 | B2 * | 11/2012 | Bauer ................... | G06K 7/0008 705/28 |
| 8,346,630 | B1 * | 1/2013 | McKeown ....................... | 705/28 |
| 2002/0072980 | A1 * | 6/2002 | Dutta ..................... | G06Q 30/06 705/26.62 |
| 2004/0064351 | A1 | 4/2004 | Mikurak et al. | |
| 2005/0114233 | A1 * | 5/2005 | Mays ................... | G06Q 10/087 705/28 |
| 2009/0240595 | A1 * | 9/2009 | Byrne ................... | G06Q 10/087 705/26.1 |

(Continued)

FOREIGN PATENT DOCUMENTS

| CN | 1290373 A | 4/2001 |
|---|---|---|
| CN | 102682395 A | 9/2012 |
| CN | 103348363 A | 10/2013 |

*Primary Examiner* — Garcia Ade
(74) *Attorney, Agent, or Firm* — Fabian VanCott; Steven L. Nichols

(57) ABSTRACT

A method of stock management for electronic transactions with a processor, includes receiving an indication that an item of stock has been selected to be purchased by a purchaser; obtaining information relating to the purchaser; and determining whether to remove the item from stock based on the obtained information.

20 Claims, 6 Drawing Sheets

(56) References Cited

U.S. PATENT DOCUMENTS

| | | | |
|---|---|---|---|
| 2010/0306080 A1* | 12/2010 | Trandal | G06Q 10/10 705/26.8 |
| 2012/0030070 A1* | 2/2012 | Keller | G06Q 10/087 705/28 |
| 2013/0046610 A1 | 2/2013 | Abraham | |
| 2013/0334309 A1* | 12/2013 | Shouraboura et al. | 235/385 |
| 2014/0114832 A1* | 4/2014 | Escott | G06Q 40/04 705/37 |
| 2014/0129417 A1* | 5/2014 | Bendel | G06Q 40/06 705/37 |

* cited by examiner

STOCK MANAGEMENT FOR ELECTRONIC TRANSACTIONS

RELATED APPLICATION

The present specification is a continuation, and claims the priority under 35 U.S.C. § 120, of previous U.S. patent application Ser. No. 14/144,117, entitled "Stock Management for Electronic Transactions," filed Dec. 30, 2013, which application is incorporated herein by reference in its entirety.

BACKGROUND

The present invention relates to stock management, and more specifically, to stock management for electronic transactions.

As the internet has continued to develop and increase in sophistication, its use in commerce has increased over the past years. Retailers, both brick and mortar retailers and electronic retailers, may provide a forum where their goods and services may be purchased electronically. For example, a user may access a retailer's website, and navigate to a number of items to be purchased. Each item may be placed in a "shopping cart" and held until checkout where a purchaser pays for the items. Via electronic transactions, goods and services may be easily selected by users from the comfort of their own home, and distributed with reduced involvement with retailer personnel.

BRIEF SUMMARY

Stock management for electronic transactions includes receiving an indication that an item of stock has been selected to be purchased by a purchaser, obtaining information relating to the purchaser, and determining whether to remove the item from stock based on the obtained information.

Stock management for electronic transactions includes receiving an indication via an electronic holding container that an item of stock has been selected to be purchased by a purchaser, obtaining a correlation between electronic holding container use and completed purchases for the purchaser, removing the item from stock when the correlation indicates a high probability that the item will be purchased, and maintaining the item in stock when the correlation does not indicate a high probability that the item will be purchased.

Stock management for electronic transactions includes supplying an electronic holding container to indicate items of stock selected to be purchased by a purchaser, receiving an indication that an item of stock has been selected to be purchased by a purchaser, obtaining a purchase history relating to the purchaser, removing the item from stock before a purchase when the purchase history indicates a high probability that the item will be purchased, and maintaining the item in stock when the purchase history does not indicate a high probability that the item will be purchased.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
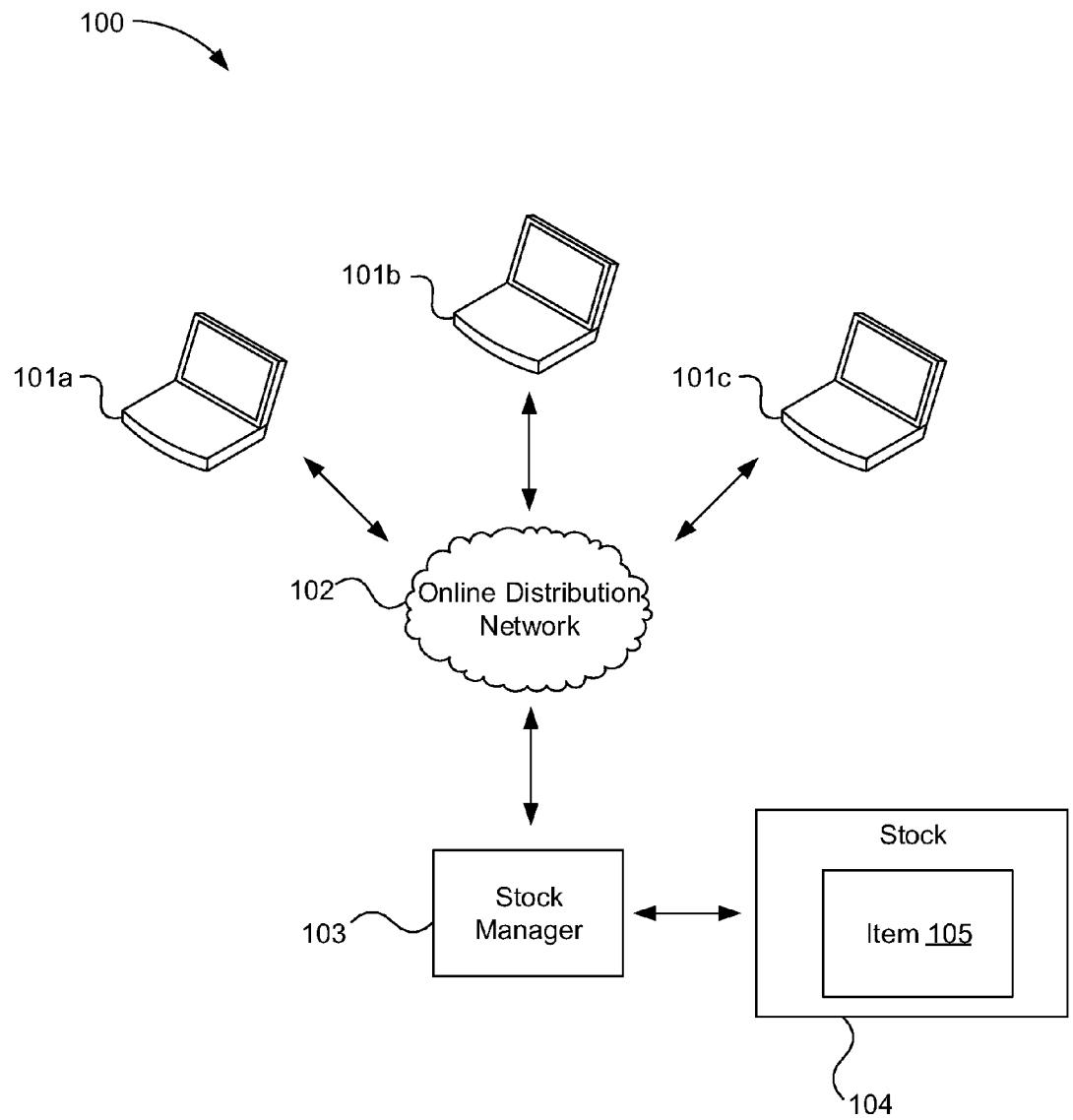
FIG. 1 is a diagram of a system for stock management for electronic transactions, according to one example of principles described herein.

The present specification describes a system and a method for stock management for electronic transactions such that items that are likely to be purchased are removed from stock before a purchase is made.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, electronic transactions are used to meet a purchaser demand for 1) greater accessibility to goods and services and 2) a simplified purchasing process of the goods and services. Moreover, a retailer or service provider may benefit from electronic transactions due to the ease of implementation of electronic transactions through an online distribution network. Additionally, via an e-commerce site a retailer or service provider may be able to present more products and services than a brick and mortar establishment. The lower operating costs of electronic transactions may make electronic transactions desirable for a provider.

However, current stock management techniques for electronic transactions may include certain inefficiencies. For example, some electronic commerce (e-commerce) stock management systems may have few options for choosing when to remove an item from available stock. In one example, the item may be removed when the purchaser puts the item, or rather an indication of an item, in a shopping cart to be held until checkout and payment. In another example, the item may be removed from stock when a user checks out or purchases the item. Both these options have certain limitations. For example, in removing an item from stock when the item is placed in a shopping cart makes the item unavailable for purchase by another purchaser. Accordingly, a retailer or service provider may lose a sale if the purchaser does not complete a purchase of the item, i.e., the item may not be available for a legitimate purchaser. By comparison, if the item is removed from stock when it is purchased, a purchaser who has put the item in his/her "shopping cart" may lose the item while shopping for other items when another individual purchases the item.

Thus, the present specification describes systems and methods for stock management for electronic transactions. More specifically, the systems and methods describe making inventory decisions about when to hold an item for a person that's still shopping by leveraging information on transaction history and purchaser buying habits.

A stock manager may receive an indication that an item has been selected to be purchased. For example, the stock manager may receive an indication that an item, or rather an indication of an item, has been placed in a shopping cart or other temporary electronic holding container. The stock manager may obtain information relating to the purchaser. The information may indicate the likelihood that a particular item will be purchased. In other words, the information may indicate the likelihood that a purchaser will pay for an item. If the information indicates there is a high likelihood that a completed purchase will result from the placement of the item in the shopping cart, the stock manager may remove the item from stock before the purchase is completed. By comparison, if the information does not indicate a high likelihood that a completed purchase will result, the stock manager may retain the item in stock until the purchase is completed.

Using a purchase history and other information relating to a purchaser may be beneficial to a retailer or service provider in that it puts goods and services in the hands of actual purchasers, rather than individuals using the electronic holding container as a placeholder. Additionally, it reduces the hazard of removing an item from stock that is unlikely to be purchased. It also may be beneficial to purchasers as it may increase the likelihood that an item of stock will be available.

An "electronic holding container" may be an electronic representation that a purchaser intends to purchase an item of stock. For example, while shopping, a purchaser may click on an icon next to the item. Clicking on the icon may put a representation of the item in an electronic holding container. While the item is in the electronic holding container, the purchaser may continue shopping and the representation of the item will remain in the electronic holding container until purchase. The retention of the representation of the item in the electronic holding container does not indicate the item itself will be retained in stock.

Further, in some examples "stock" may include goods, services, or combinations thereof offered by a retailer or service provider. Likewise, the term "stock provider" may refer to any entity that provides goods and services to purchasers. For example, a retailer may provide products to a purchaser. In another example, a service provider may provide a service to a purchaser. In these examples both the retailer and the service provider may be stock providers.

Yet further, as used in the present specification and in the appended claims, "checking out" may include the purchase of an item, or other transfer of title of the item. In some examples, additional events may occur during checkout including gathering credit card information, gathering mailing/billing address, or verifying credit card information, mailing information, or billing information.

As used in the present specification and in the appended claims, the phrase "a number of" or similar language may be any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system (100) for stock management for electronic transactions, according to one example of principles described herein. By way of introduction, via a user device (101), a purchaser may purchase an item (105) of stock (104) via an online distribution network (102). A stock manager (103) may manage the stock (104). More specifically, the stock manager (103) may determine when to remove an item (105) from stock (104).

The system (100) may include a number of user devices (101). In one example, a user uses a user device (101) to access an online distribution network (102) for a stock provider. An online distribution network (102) may be a forum that allows stock providers, i.e., retailers and service providers to provide their goods and services to purchasers. For example, an online distribution network (102) may be an e-commerce site for a product retailer. In another example, the online distribution network (102) may be any online interface where a service provider may provide their services to purchasers. For example, an airline may implement an online distribution network (102) to offer airline tickets. Other examples of service providers that may implement an online distribution network (102) include hotels that offer room reservations and concert promoters that offer concert tickets. While specific reference is made to retailers and service providers, the methods and systems described herein may be implemented in any situation that involves an electronic holding container such as a shopping cart.

In some examples the online distribution network (102) may pertain to stock providers that provide their services or products solely via the online distribution network (102). For example, a retailer may not have a physical location where goods are sold. In another example, the online distribution network (102) may be used in addition to a physical facility. For an example, a retailer may distribute goods via an e-commerce site in addition to a physical facility.

The users of the online distribution network (102) may access the online distribution network (102) via a number of user devices (101). Examples of user devices (101) include desktop computers, laptop computers, smartphones, personal digital assistants (PDAs), and tablets, among other electronic devices. In other words, a user device (101) may be any electronic device that allows a user to carry out an online transaction via an online distribution network (102).

A stock manager (103) may manage stock (104) for an electronic transaction. The stock manager (103) may determine when to remove an item (105) from stock (104) based on information gathered about a purchaser. For example, the stock manager (103) may receive an indication about the purchasing habits of the purchaser. This information may indicate the likelihood that an item (105) represented in the electronic holding container is likely to be purchased. If it is likely that the item (105) will be purchased, the stock manager (103) may remove the item (105) from stock (104) when a representation of the item (105) is placed in the electronic holding container before the actual purchase of the item (105). By comparison, if it is not likely that the item (105) will be purchased, the stock manager (103) may retain the item (105) in stock (104) until the item (105) is actually purchased at checkout. More detail concerning the determination of when to remove an item (105) from stock (104) is given below.

Leveraging information about a purchaser to make determinations regarding stock management may be beneficial in that it removes items (105) from stock (104) when there is a high probability that a completed transaction will occur. Accordingly, instances of stock (104) shortages and lost items (105) during shopping may be reduced.

Figure 2:
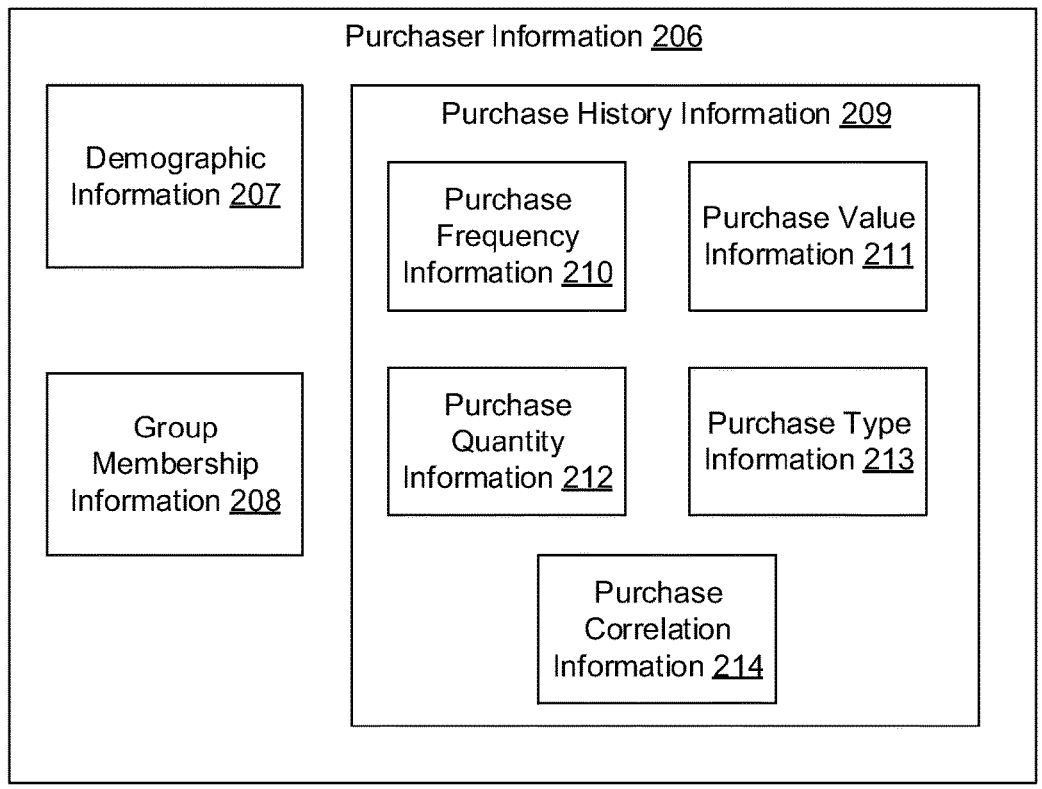
FIG. 2 is a diagram of purchaser information, according to one example of principles described herein.

FIG. 2 is a diagram of purchaser information (206), according to one example of principles described herein. As described above, the stock manager (FIG. 1, 103) may determine whether to remove items (FIG. 1, 105) from stock (FIG. 1, 104) based on purchaser information (206). In one example, the purchaser information (206) may include demographic information (207). The demographic information (207) may include any information that indicates a demographic of a purchaser. For example, the demographic information (207) may indicate an age demographic, a gender demographic, an income demographic, and a location demographic, among other types of demographic information (207). The demographic information (207) may be used to determine whether or not to remove an item (FIG. 1, 105) from stock (FIG. 1, 104) when an item (FIG. 1, 105) is placed in an electronic holding container.

The purchaser information (206) may also include group membership information (208). The group membership information (208) may indicate whether a purchaser is a member of a particular group of the stock provider. For example, a purchaser may pay a premium to be a member of a particular group. In this example, by being a member of the group, an item (FIG. 1, 105) may be removed from stock (FIG. 1, 104), when the member places the item (FIG. 1, 105) in an electronic holding container. By comparison, in some examples if the purchaser is not a member of the particular group, items (FIG. 1, 105) may be removed from stock (FIG. 1, 104) when paid for at checkout.

In another example, a stock provider may afford certain purchasers preferential treatment. For example, a stock provider may allow employees, or distributors to be in a group. When members of this group indicate their intent to purchase an item (FIG. 1, 105) by placing the item (FIG. 1, 105) in an electronic holding container, the item (FIG. 1, 105) may be removed from stock (FIG. 1, 104). By comparison, if a purchaser is not a member of the group, an item (FIG. 1, 105) may be removed from stock when the item (FIG. 1, 105) is paid for at checkout.

The purchaser information (206) may include purchase history information (209). Purchase history information (209) may be any information that indicates the purchase habits of a purchaser. For example, the purchase history information (209) may include purchase frequency information (210). The purchase frequency information (210) may indicate the frequency of past purchases. For example, the purchase frequency information (210) may indicate how many purchases the purchaser makes for a given period of time, i.e., a month or a year. The purchase history information (209) may also include purchase value information (211). The purchase value information (211) may indicate a value of past purchases. For example, the purchase value information (211) may indicate a dollar value of individual purchases, or may indicate a collective dollar value of past purchases. Purchase quantity information (212) may indicate a quantity of past purchases. Purchase type information (213) may indicate the type of past purchases. For example, the purchase type information (213) may categorize the past purchases. Examples of categories include, type of purchases (i.e., furniture, appliances, electronic goods, literature, media, household items, consumable items, consumer goods, services, among other purchase types) and price category or purchases (high value, low value, among other price categories), among other purchase categories. As will be described below, in some examples, purchase type information (213) may be used to indicate a likelihood of a different purchase. For example, a user at some point in time may have purchased a first book in a series. This may indicate a high likelihood that the user will purchase the second book in the series, the second book being in the electronic holding container. In another example, if a user has purchased a particular brand of baby bottles, this may indicate a high likelihood that the user will purchase bottle accessories of the same brand.

Purchase correlation information (214) may indicate a correlation between electronic holding container use and completed purchases. For example, the purchase correlation information (214) may be a ratio that compares electronic holding container use for items (FIG. 1, 105), and completed purchase for those items (FIG. 1, 105).

The purchase history information (209) may include information that represents a combination of the aforementioned types of information. For example, the purchase history information (209) may identify past purchases based on frequency and value. A specific example is given as follows. The purchase history information (209) may indicate the dollar values for individual purchases in the past twelve months. In another example, the purchase history information (209) may indicate what types of products or services (i.e., what purchase categories) have been purchased in the last twelve months, and the dollar values of those purchases.

In some examples, the purchaser information (206) may be stored on a database operated by the stock provider. In another example, the purchaser information (206) may be stored on a database that is external to the stock provider. For example, a stock provider may implement a third-party service to obtain the purchaser information (206). In another example, a stock provider may rely on a credit report obtained from a third-party credit company to obtain purchaser information (206) that indicates the transaction history of a purchaser.

In another specific example, the purchaser information (206) may be obtained based on a profile obtained via a network. For example, the stock manager (FIG. 1, 103) may obtain purchaser profile information gathered from social networking sites.

Figure 3:
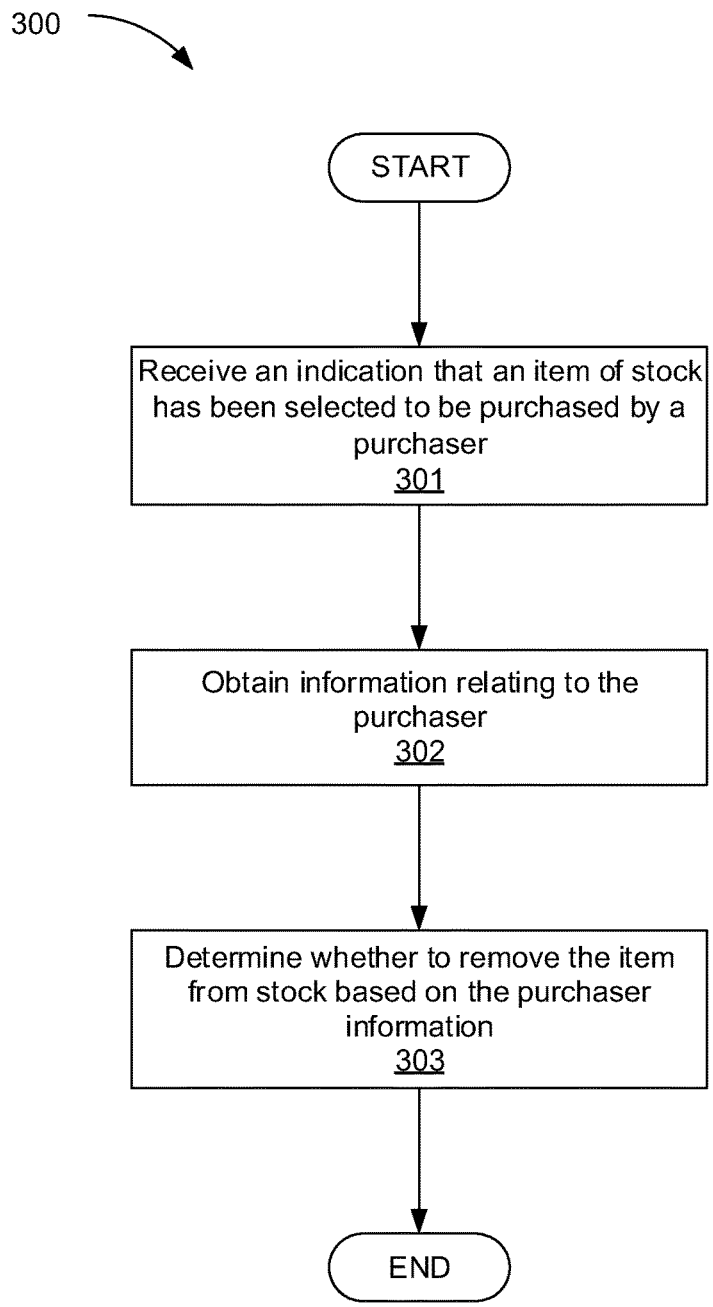
FIG. 3 is a flowchart of a method of stock management for electronic transactions, according to one example of principles described herein.

FIG. 3 is a flowchart of a method (300) of stock management for electronic transactions, according to one example of principles described herein. The method (300) may be performed by the stock manager (FIG. 1, 103). The stock manager (FIG. 1, 103) may receive (block 301) an indication that an item (FIG. 1, 105) of stock (FIG. 1, 104) has been selected to be purchased by a purchaser. In some examples, the indication may include a representation of an item (FIG. 1, 105) being placed in an electronic holding container. For example, while shopping, an individual may identify an item (FIG. 1, 105) that he/she intends to purchase. The individual may select an icon corresponding to the item (FIG. 1, 105). Selecting the icon may direct the stock manager (FIG. 1, 103) to place a representation of the item (FIG. 1, 105) in the electronic holding container or shopping cart. While specific reference is made to selection of an icon and placement of a representation of the item in an electronic holding container, any type of indication may be implemented in the method (300). For example, a purchaser may make an airline reservation. The reservation may be an indication of an item (FIG. 1, 105) of stock (FIG. 1, 104) that has been selected to be purchased.

While shopping, a purchaser may place a number of representations of items (FIG. 1, 105) in the shopping cart and continue shopping. When shopping is completed, the purchaser may view the items (FIG. 1, 105) in the electronic holding container and complete a purchase of the items (FIG. 1, 105), in which the items (FIG. 1, 105) are paid for and shipped.

Once a purchaser has selected an item (FIG. 1, 105), the stock manager (FIG. 1, 103) may obtain (block 302) purchaser information (FIG. 2, 206) relating to the purchaser. For example, the stock manager (FIG. 1, 103) may retrieve purchaser information (FIG. 2, 206) from a database operated by the stock provider. The stock manager (FIG. 1, 103) may obtain (block 302) purchaser information (FIG. 2, 206) from a database independent of the stock provider. For example, the stock manager (FIG. 1, 103) may use a third-party to obtain purchaser information (FIG. 2, 206). The stock manager (FIG. 1, 103) may obtain (block 302) purchaser information (FIG. 2, 206) from information available on a network. For example, the stock manager (FIG. 1, 103) may obtain (block 302) purchaser information (FIG. 2, 206) from social networking sites.

As described above, the purchaser information (FIG. 2, 206) may include demographic information (FIG. 2, 207) of the purchaser, group membership information (FIG. 2, 208) of the purchaser, purchase history information (FIG. 2, 209), or combinations thereof. Similarly, as described above, the purchase history information (FIG. 2, 209) may include purchase frequency information (FIG. 2, 210), purchase quantity information (FIG. 2, 212), purchase value information (FIG. 2, 211), purchase type information (FIG. 2, 213), and past purchase correlation information (FIG. 2, 214), or combinations thereof. The stock manager (FIG. 1, 103) may obtain any type of information that indicates a purchase history or purchasing habits of a purchaser.

The stock manager (FIG. 1, 103) may determine (block 303) whether to remove the item (FIG. 1, 105) from stock (FIG. 1, 104) based on the purchaser information (FIG. 2, 206). For example, if the purchaser information (FIG. 2, 206) indicates that the purchaser is likely to complete a purchase of the item (FIG. 1, 105), the stock manager (FIG. 1, 103) may remove the item (FIG. 1, 105) from stock (FIG. 1, 104) when the item (FIG. 1, 105) is placed in an electronic holding container. By comparison, if the purchaser information (FIG. 2, 206) indicates that the purchaser is not likely to complete a purchase of the item (FIG. 1, 105), the stock manager (FIG. 1, 103) may retain the item (FIG. 1, 105) in stock (FIG. 1, 104) until a later point in time, for example when the item (FIG. 1, 105) is purchased or when the item (FIG. 1, 105) is no longer a low availability item (FIG. 1, 105). More detail regarding the decision to remove an item (FIG. 1, 105) from stock (FIG. 1, 104) based on the likelihood of a completed purchase is given below in connection with FIG. 4.

In another example, the stock manager (FIG. 1, 103) may determine (block 303) whether to remove an item (FIG. 1, 105) from stock (FIG. 1, 104) based on group membership information (FIG. 2, 208). For example, if the group membership information (FIG. 2, 208) indicates that the purchaser holds a particular membership with the stock provider, or is a member of a particular group, the stock manager (FIG. 1, 103) may remove the item (FIG. 1, 105) from stock (FIG. 1, 104) when it is added to the electronic holding container. By comparison, if the member does not hold the particular membership, or is not a member of a particular group, the item (FIG. 1, 105) may be held in stock (FIG. 1, 104) until the time of purchase. While specific reference is made to a few types of purchaser information (FIG. 2, 206), any type of purchaser information (FIG. 2, 206) described in connection with FIG. 2, or any other type of information that indicates purchase history and/or purchase habits of a purchaser may be used to determine when to remove an item (FIG. 1, 105) from stock (FIG. 1, 104).

In some examples, the method (300) may be implemented for a particular class of items (FIG. 1, 105). The class of items (FIG. 1, 105) may be based on the availability of the item (FIG. 1, 105) in stock (FIG. 1, 104). For example, the method (300) may be implemented for low availability items (FIG. 1, 105). More specifically, if a quantity of an item (FIG. 1, 105) in stock (FIG. 1, 104) is less than a predetermined threshold level, the stock manager (FIG. 1, 103) may implement the method (300) to determine when to remove the low availability item (FIG. 1, 105) from stock (FIG. 1, 104). By comparison, in this example, if a quantity of an item (FIG. 1, 105) is not below a predetermined threshold level, the stock manager (FIG. 1, 103) may remove the item (FIG. 1, 105) from stock (FIG. 1, 104) when the item (FIG. 1, 105) is placed in an electronic holding container.

In another example, the method (300) may be applied to items (FIG. 1, 105) of stock (FIG. 1, 104) in general. In this example, all items (FIG. 1, 105) in stock (FIG. 1, 104), regardless of the quantity, may be purchased using the systems and methods described herein.

In some examples, the method (300) may be applied to a particular group of selected items (FIG. 1, 105) of stock (FIG. 1, 104). For example, a stock provider may select a number of items (FIG. 1, 105) that are likely to be popular. The potentially popular items (FIG. 1, 105) may be removed from stock (FIG. 1, 104) based on purchaser information (FIG. 2, 206) as described herein. By comparison, items (FIG. 1, 105) of stock (FIG. 1, 104) that are not likely to be popular may be removed from stock (FIG. 1, 104) when placed in an electronic holding container. While specific reference is made to group selection based on popularity, any criteria may be implemented to determine which items (FIG. 1, 105) will be removed from stock (FIG. 1, 104) based on purchaser information (FIG. 2, 206). For example, which items (FIG. 1, 105) may be managed via the method (300) may be based on a release date of the item (FIG. 1, 105).

Basing a determination of when to remove an item (FIG. 1, 105) from stock (FIG. 1, 104) on purchaser information (FIG. 2, 206) may be beneficial in that it manages low availability items (FIG. 1, 105) in stock (FIG. 1, 104) efficiently. That is, low availability items (FIG. 1, 105) may be maintained in stock (FIG. 1, 104) in scenarios where it is less likely that the item (FIG. 1, 105) will be purchased. Similarly, the method (300) may be beneficial in that it ensures an item (FIG. 1, 105) is available to a purchaser who is likely to complete a purchase of an item (FIG. 1,105), thus providing a satisfactory purchaser experience.

Figure 4:
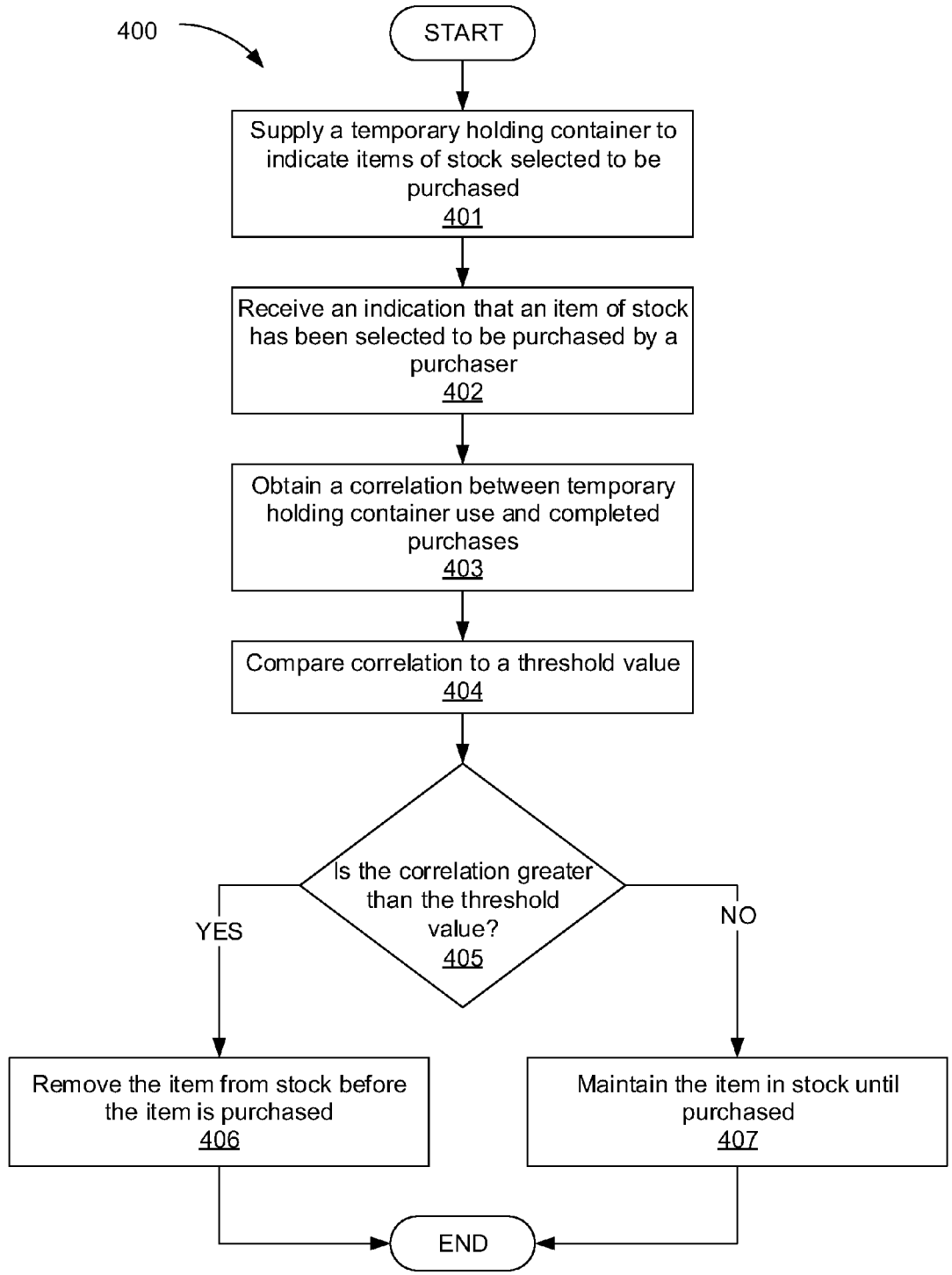
FIG. 4 is a flowchart of another method of stock management for electronic transactions, according to one example of principles described herein.

FIG. 4 is a flowchart of another method (400) of stock management for electronic transactions, according to one example of principles described herein. The method (400) may be performed by the stock manager (FIG. 1, 103). The stock manager (FIG. 1, 103) may supply (block 401) an electronic holding container to indicate items (FIG. 1, 105) of stock (FIG. 1, 104) selected to be purchased. As described above, an electronic holding container, temporary holding container, shopping cart or similar terminology may contain a representation of an item (FIG. 1, 105) that has been selected by a purchaser for subsequent purchase. The representation may remain in the shopping cart while the purchaser continues shopping and may be removed during a subsequent purchase.

The stock manager (FIG. 1, 103) may receive (block 402) an indication that an item (FIG. 1, 105) of stock (FIG. 1, 104) has been selected to be purchased by a purchaser. This may be performed as described in connection with FIG. 3.

The stock manager (FIG. 1, 103) may obtain (block 403) a correlation between electronic holding container use and completed purchases. As described above, the purchaser information (FIG. 2, 206) may include purchase history information (FIG. 2, 209) which may be any information that indicates a likelihood that a particular purchaser is going to complete a purchase of an item (FIG. 1, 105). In some examples, the correlation may be a ratio that compares a number of times items (FIG. 1, 105) were placed in an electronic holding container with the number of times items (FIG. 1, 105) were actually purchased. For example, the ratio may indicate that 75% of the time, a purchaser completes a transaction for an item the purchaser had previously placed in an electronic holding container. In other words, the correlation may indicate a likelihood that a purchaser will purchase an item (FIG. 1, 105) placed in the electronic holding container.

The correlation may reflect any of the various types of purchase history information (FIG. 2, 209). For example, the correlation may indicate the likelihood that a high value item (FIG. 1, 105) placed in the electronic holding container will be purchased. In another example, the correlation may indicate the likelihood that a particular type of item (FIG. 1, 105) (i.e., an electronic good) placed in an electronic holding container will be purchased.

The stock manager (FIG. 1, 103) may compare (block 404) the correlation to a threshold value. The threshold value may be a numeric value that indicates when an item (FIG. 1, 105) should be removed from stock (FIG. 1, 104) before a purchase. For example, a stock provider may implement a predetermined threshold value of 75%. This threshold indicates that in order for an item (FIG. 1, 105) of stock (FIG. 1, 104) to be removed from stock (FIG. 1, 104) before a purchase, a purchaser should historically purchase items (FIG. 105) placed in the electronic holding container 75% of the time.

As described above, in some examples, the correlation may reflect any of the various types of purchase history information (FIG. 2, 209). Similarly, the threshold value may reflect any of the various types of purchase history information (FIG. 2, 209). For example, a stock provider may implement a 75% threshold value for electronic goods and may also implement a 90% threshold value for newly released or high value items (FIG. 1, 105). Accordingly, the stock manager (FIG. 1, 103) may determine (block 405) whether the correlation is greater than the threshold value.

If the stock manager (FIG. 1, 103) determines (block 405, determination YES) that the correlation ratio is greater than the threshold value, the stock manager (FIG. 1, 103) may remove (block 406) the item (FIG. 1, 105) from stock (FIG. 1, 104). More specifically, the stock manager (FIG. 1, 103) may remove (block 406) the item (FIG. 1, 105) from stock (FIG. 1, 104) before the item (FIG. 1, 105) is purchased. In other words, the stock manager (FIG. 1, 103) may remove (block 406) the item (FIG. 1, 105) from stock (FIG. 1, 104) when the purchaser information (FIG. 2, 206) or purchase history information (FIG. 2, 209) indicates there is a high likelihood that a transaction will be completed.

Removing an item (FIG. 1, 105) from stock (FIG. 1, 104) before it is purchased when the purchaser information (FIG. 2, 206) indicates a high likelihood of a completed transaction may be beneficial in that reduces the likelihood, for at least some purchasers, that an item (FIG. 1, 105) will be lost. In other words, the likelihood that an item (FIG. 1, 105) in a purchaser's shopping cart will be removed from stock (FIG. 1, 104) due to a purchase by another purchaser will be reduced. This may result in a satisfactory experience for the purchaser and may promote completed economic transactions.

By comparison, if the stock manager (FIG. 1, 103) determines (block 405, determination NO) that the correlation ratio is not greater than the threshold value, the stock manager (FIG. 1, 103) may maintain (block 407) the item (FIG. 1, 105) in stock (FIG. 1, 104) until the item (FIG. 1, 105) is purchased. The stock manager (FIG. 1, 103) may maintain (block 407) the item (FIG. 1, 105) in stock (FIG. 1, 104) when the purchaser information (FIG. 2, 206) or purchase history information (FIG. 2, 209) does not indicate there is a high likelihood that a transaction will be completed.

Maintaining (block 407) an item (FIG. 1, 105) in stock (FIG. 1, 104) until it is purchased when the purchase information (FIG. 2, 205) does not indicate a high likelihood of a completed transaction may be beneficial in that it reduces the likelihood that a stock provider will lose a sale. In other words, the method (400) may reduce the likelihood that an item (FIG. 1, 105) is not available to an actual purchaser because another individual is merely placing an item (FIG. 1, 105) in an electronic holding container without an intention to complete a purchase. Using this method (400), an item (FIG. 1, 105) is removed from stock (FIG. 1, 104) at the moment it is likely that a completed purchase will result, whether that be when the item (FIG. 1, 105) is placed in an electronic holding container by a "high confidence" purchaser, or when the item (FIG. 1, 105) is purchased by a "low confidence" purchaser. This may increase the likelihood that an item (FIG. 1, 105) is available to a serious buyer which may result in a satisfactory purchaser experience.

An example of managing stock (FIG. 1, 104) as described herein is given as follows. A first purchaser may place a representation of an item (FIG. 1, 105) to be purchased in an electronic holding container. The purchaser information (FIG. 2, 206) for the first purchaser may indicate that the first purchaser has historically purchased 90% of the items (FIG. 1, 105) they have placed in an electronic holding container. Accordingly, if the stock provider has a threshold value of 75%, the stock manager (FIG. 1, 103) may remove the item (FIG. 1, 105) from stock (FIG. 1, 104) when the first purchaser places the item (FIG. 1, 105) in the electronic holding container.

By comparison, a second purchaser may place a representation of an item (FIG. 1, 105) to be purchased in an electronic holding container. The purchaser information (FIG. 2, 206) for the second purchaser may indicate that the first purchaser has historically purchased 50% of the items (FIG. 1, 105) they have placed in an electronic holding container. Accordingly, if the stock provider has a threshold value of 75%, the stock manager (FIG. 1, 103) may maintain the item (FIG. 1, 105) in stock (FIG. 1, 104) until the second purchaser completes a purchase of the item (FIG. 1, 105) at checkout.

Figure 5:
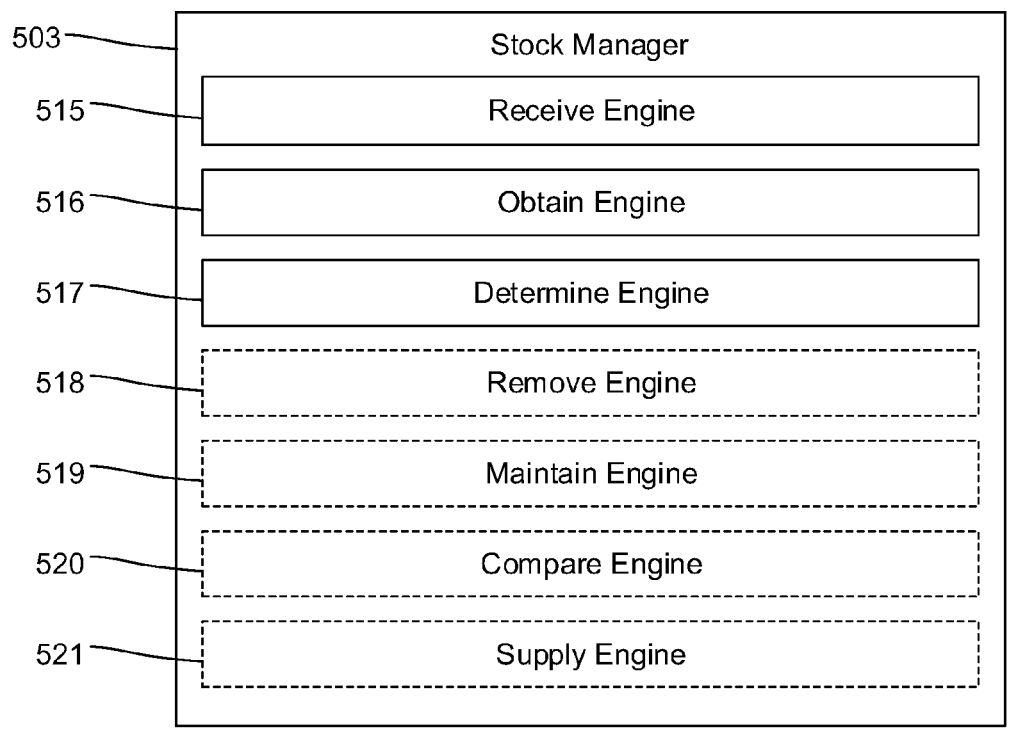
FIG. 5 is a diagram of an example of a stock manager, according to the principles described herein.

FIG. 5 is a diagram of an example of a stock manager (503), according to the principles described herein. The stock manager (503) may be an example of the stock manager (FIG. 1, 103) described in connection with FIG. 1. The stock manager (503) may include a receive engine (515), an obtain engine (516), and a determine engine (517). In this example, the stock manager (503) may also include a remove engine (518), a maintain engine (519), a compare engine (520), and a supply engine (512). The engines (515, 516, 517, 518, 519, 520, 521) refer to a combination of hardware and program instructions to perform a designated function. Each of the engines (515, 516, 517, 518, 519, 520, 521) may include a processor to execute the designated function of the engine.

The receive engine (515) may receive an indication that an item (FIG. 1, 105) of stock (FIG. 1, 104) has been selected to be purchased by a purchaser. For example, the receive engine (515) may receive an indication that an item (FIG. 1, 105) of stock (FIG. 1, 104) has been placed in an electronic holding container such as an electronic shopping cart. In some examples the item (FIG. 1, 105) may be a low availability item (FIG. 1, 105), an item (FIG. 1, 105) particularly selected from stock (FIG. 1, 104), or combinations thereof.

The obtain engine (516) may obtain information relating to the purchaser. The information may include purchaser information (FIG. 2, 206). More specifically, the purchaser information (FIG. 2, 206) may include demographic information (FIG. 2, 207) for the purchaser, group membership information (FIG. 2, 208) for the purchaser, purchase history information (FIG. 2, 209) for the purchaser, or combinations thereof. The purchase history information (FIG. 2, 209) may include purchase frequency information (FIG. 2, 210), purchase value information (FIG. 2, 211), purchase quantity information (FIG. 2, 212), purchase type information (FIG. 2, 213), purchase correlation information (FIG. 2, 214), and combinations thereof, among any other information that indicates a purchase history or purchasing habits of the purchaser. The purchaser information (FIG. 2, 206) and purchase history information (FIG. 2, 209) may indicate a likelihood that the item will be purchased.

The determine engine (517) may determine whether to remove the item (FIG. 1, 105) from stock (FIG. 1, 104) based on the purchaser information (FIG. 2, 206). The remove engine (518) may remove an item (FIG. 1, 105) from stock (FIG. 1, 104). More specifically, the remove engine (518) may remove an item (FIG. 1, 105) from stock (FIG. 1, 104) before a purchase of the item when the purchaser information (FIG. 2, 206) or the purchase history information (FIG. 2, 209) indicates a high probability that the item (FIG. 1, 105) will be purchased.

The maintain engine (519) may maintain the item (FIG. 1, 105) in stock (FIG. 1, 104). More specifically, the maintain engine (519) may maintain the item (FIG. 1, 105) in stock (FIG. 1, 104) when the purchaser information (FIG. 2, 205) does not indicate a high probability that the item (FIG. 1, 105) will be purchased.

The compare engine (520) may compare the purchaser information (FIG. 2, 206) to a threshold value. For example, the purchaser information (FIG. 2, 206) may include a correlation which is a ratio of the number of times items (FIG. 1, 105) were selected for purchase by a purchaser to the number of times items (FIG. 1, 105) were actually purchased by the purchaser. Accordingly, the compare engine (520) may compare this ratio to a predetermined threshold value. The remove engine (518), the maintain engine (519), or combinations thereof, may use the compare engine (520) results to determine whether to remove an item (FIG. 1, 105) from stock (FIG. 1, 104) before the item (FIG. 1, 105) is purchased.

Figure 6:
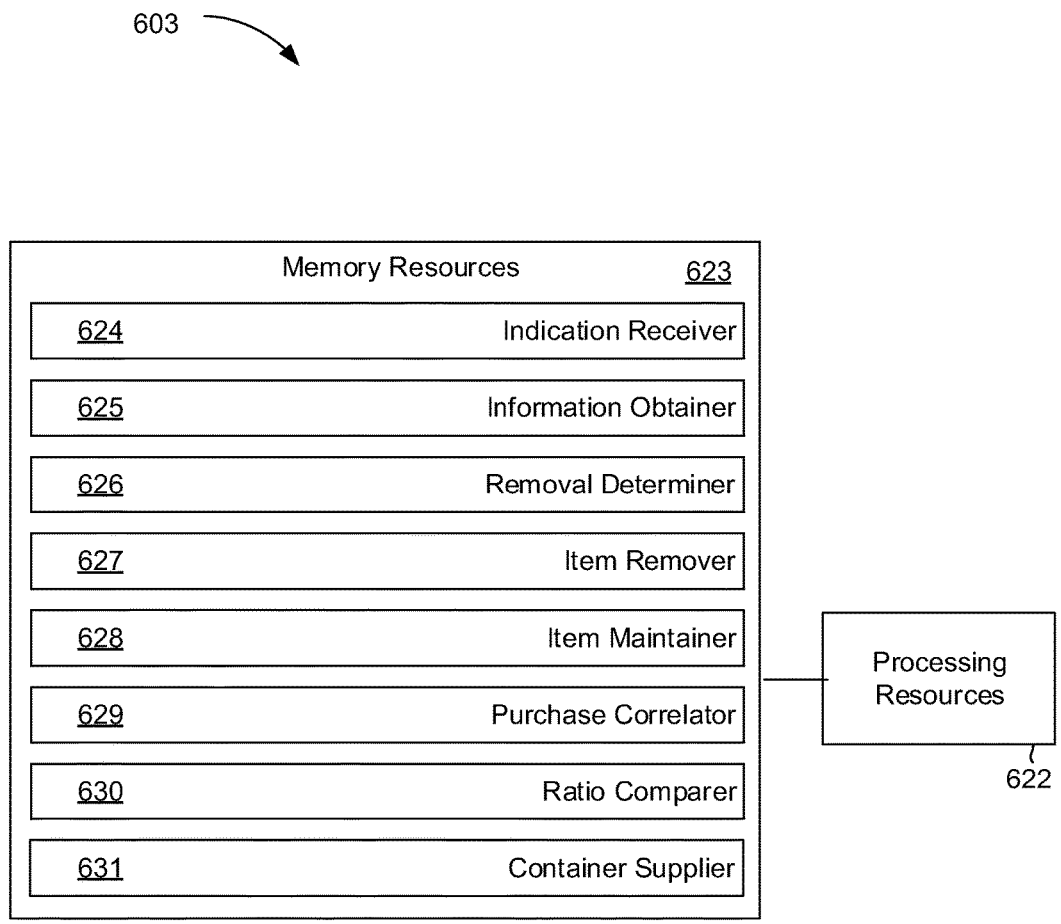
FIG. 6 is a diagram of an example of a stock manager, according to the principles described herein.

FIG. 6 is a diagram of an example of a stock manager (603), according to the principles described herein. The stock manager (603) may be an example of the stock manager (FIG. 1, 103) described in connection with FIG. 1. In this example, the stock manager (603) may include processing resources (622) that are in communication with memory resources (623). Processing resources (622) may include at least one processor and other resources used to process programmed instructions. The memory resources (623) represent generally any memory capable of storing data such as programmed instructions or data structures used by the stock manager (603). The programmed instructions shown stored in the memory resources (623) may include an indication receiver (624), an information obtainer (625), a removal determiner (626), an item remover (627), an item maintainer (628), a purchase correlator (629), a ratio comparer (630), and a container supplier (631).

The memory resources (623) include a computer readable storage medium that contains computer readable program code to cause tasks to be executed by the processing resources (622). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The indication receiver (623) represents programmed instructions that, when executed, cause the processing resources (622) to receive an indication that an item (FIG. 1, 105) of stock (FIG. 1, 104) has been selected to be purchased by a purchaser. The information obtainer (625) represents programmed instructions that, when executed, cause the processing resources (622) to obtain information relating to the purchaser. The removal determiner (626) represents programmed instructions that, when executed, cause the processing resources (622) to determine whether to remove an item (FIG. 1, 105) from stock (FIG. 1, 104) based on the obtained information. The item remover (627) represents programmed instructions that, when executed, cause the processing resources (622) to remove an item (FIG. 1, 105) from stock (FIG. 1, 104) based on the obtained information. The item maintainer (628) represents programmed instructions that, when executed, cause the processing resources (622) to maintain an item (FIG. 1, 105) in stock (FIG. 1, 104) based on the obtained information.

The purchase correlator (629) represents programmed instructions that, when executed, cause the processing resources (622) to obtain a correlation between electronic holding container use and completed purchases for the purchaser. The ratio comparer (630) represents programmed instructions that, when executed, cause the processing resources (622) to compare a ratio between the number of times items (FIG. 1, 105) were selected for purchase by the purchaser to the number of times items (FIG. 1, 105) were purchased to a threshold value. The container supplier (631) represents programmed instructions that, when executed, cause the processing resources (622) to supply an electronic holding container to indicate items (FIG. 1, 105) of stock (FIG. 1, 104) selected to be purchased by a purchaser.

Further, the memory resources (623) may be part of an installation package. In response to installing the installation package, the programmed instructions of the memory resources (623) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (622) and the memory resources (623) are located within the same physical component, such as a server, or a network component. The memory resources (623) may be part of the physical component's main memory, caches, registers, non-volatile memory, or elsewhere in the physical component's memory hierarchy. Alternatively, the memory resources (623) may be in communication with the processing resources (622) over a network. Further, the data structures, such as the libraries, may be accessed from a remote location over a network connection while the programmed instructions are located locally. Thus, the stock manager (603) may be implemented on a user device, on a server, on a collection of servers, or combinations thereof.

The stock manager (603) of FIG. 6 may be part of a general purpose computer. However, in alternative examples, the stock manager (603) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method of stock management of an inventory of items for sale via a computer network via electronic transactions with a processor, the method comprising:
   managing a database of the inventory of items available for sale, the items being physically located at one or more physical locations for shipping to purchasers;
   receiving an indication that an item of stock has been selected electronically to potentially be purchased by a purchaser in response to that item being placed in an electronic holding container prior to the item actually being purchased, the purchaser using a remote user interface for browsing the database of the inventory of items available for sale;
   obtaining information relating to the purchaser; and
   determining whether to remove the item from stock based on the obtained information, wherein based on the determination, the item is or is not listed as available to another purchaser in the database of the inventory of items so as to minimize instances of the item being unavailable to a second purchaser due to being in the electronic holding container of a first user who does not complete purchase of the item, the method thereby controlling the inventory of items available for sale.

2. The method of claim 1, in which the information includes demographic information of the purchaser.

3. The method of claim 1, further comprising removing the item from stock before the item is purchased based on the obtained information.

4. The method of claim 1, in which the obtained information indicates a group membership of the purchaser.

5. The method of claim 1, in which the obtained information indicates a correlation between use of the electronic holding container and completed purchases.

6. The method of claim 1, in which the obtained information includes purchase history information.

7. The method of claim 1, further comprising: when obtaining the information, obtaining a correlation between electronic holding container use and completed purchases for the purchaser,
   removing the item from stock when the correlation indicates a high probability that the item will be purchased, and
   maintaining the item in stock when the correlation does not indicate a high probability that the item will be purchased.

8. The method of claim 7, in which the correlation is a ratio of the number of times an item was selected for purchase to the number of times an item was purchased.

9. The method of claim 8, further comprising comparing the ratio to a threshold value.

10. The method of claim 9, further comprising:
    removing the item from stock when the ratio is greater than the threshold value; and
    maintaining the item in stock when the ratio is not greater than the threshold value.

11. The method of claim 7, in which the item is a low availability item.

12. The method of claim 7, in which the item is one of a number of selected items of stock.

13. The method of claim 7, in which the correlation is based on purchase frequency information, purchase quantity information, purchase value information, purchase type information, purchaser group membership information, or combinations thereof.

14. The method of claim 7, in which the correlation indicates a likelihood that the item will be purchased.

15. The method of claim 1, further comprising:
    obtaining purchase history information relating to the purchaser;
    removing the item from stock before a purchase when the purchase history indicates a high probability that the item will be purchased; and
    maintaining the item in stock when the purchase history does not indicate a high probability that the item will be purchased.

16. The method of claim 15, in which the purchase history information indicates a frequency of past purchases.

17. The method of claim 15, in which the purchase history information indicates a quantity of past purchases.

18. The method of claim 15, in which the purchase history information indicates a value of a number of past purchases.

19. The method of claim 15, in which the purchase history information indicates a type of a number of past purchases.

20. The method of claim 19, in which a type of a number of past purchases indicates a furniture purchase, appliance purchase, media purchase, electronic goods purchase, literature purchase, household items purchase, consumable items purchase, consumer goods purchase, services, or combinations thereof.

* * * * *